United States Patent Office 3,428,597
Patented Feb. 18, 1969

3,428,597
STABILIZATION OF POLYAMIDES
Gerardus P. Dikötter, Geleen, and Arnoldus A. W. Schaapveld and Pierre J. Franssen, Stein, Netherlands, assignors to Stamicarbon N.V., Heerlen, Netherlands
No Drawing. Filed Feb. 2, 1966, Ser. No. 524,486
Claims priority, application Netherlands, Feb. 2, 1965, 6501290
U.S. Cl. 260—45.75     6 Claims
Int. Cl. C08g *51/58, 51/62;* C07f *9/28*

ABSTRACT OF THE DISCLOSURE

Stabilizers for polyamide compositions are disclosed, composed of the complex compounds of cuprous iodide and a hydrocarbon phosphine or phosphite compound.

---

This invention relates to the stabilization of polyamides.

The mechanical properties of polyamides are known to be adversely affected by light, heat and air when the polyamides do not contain a stabilizer.

Many substances have been recommended in the past as stabilizers for polyamides; however, the effective long-term stabilization of the mechanical properties and the resistance against discoloration remains a problem which requires satisfactory solution. This is especially so since the production of polyamides is increasing and the applications of these products are becoming more numerous. It is of great importance that excellent stabilizers be available.

A mixture of an organic copper salt and phosphorus triiodide has been proposed for the stabilization of polyamides (see German Patent No. 1,152,816). This stabilizer may be added to the monomer before the polymerization, or it may be added to the polyamide during or after the polymerization.

It has also been proposed to use a complex compound of a copper halide with an amine, a diamine or a polyamine optionally with a phosphorus acid or a phosphoric acid or a salt of these acids, for stabilizing polyamides (see British Patent No. 922,706).

It is an object of the present invention to provide a new and improved stabilizer and a novel process for stabilizing polyamides.

A further object of the invention is to provide novel and improved stabilized polyamide compositions.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

This invention provides the improved stabilization of polyamides with a stabilizer containing phosphorus, copper and iodine, which when added either before, during or after the polymerization reaction, produces exceptionally stable products. More specifically, the present invention contemplates as the stabilizer the use of a complex compound of cuprous iodide with a hydrocarbon phosphine or a hydrocarbon phosphite.

The complex compounds of cuprous iodide provided as stabilizers by this invention can be obtained by adding cuprous iodide to a solution of hydrocarbon phosphite or hydrocarbon phosphine in a suitable organic hydrocarbon solvent, e.g., benzene, toluene, and cyclohexane, and stirring the mixture. The amount of solvent used is not critical. For example, 300 to 500 cc. of solvent may be used for 100 grams of the complex formed. The complex compound thus formed is soluble, and the excess cuprous iodide can be separated by filtration, for instance. The complex compound is then obtained by removing the solvent.

In preparing the complex-compound stabilizer of this invention, generally one mole of cuprous iodide is needed for each two moles of the hydrocarbon phosphite or phosphine. As a matter of practice, it is preferred to use a small excess (e.g., 5–25%) of cuprous iodide, to insure that all of the hydrocarbon material is reacted. However, this excess of cuprous iodide is not necessary, or critical. The reaction may be carried out at room temperature although higher temperatures up to the boiling temperature of the solvent are preferred.

After the solvent is removed, the complex compound is seen to be usually a highly viscous oily liquid which crystallizes slowly when allowed to stand.

The hydrocarbon phosphites and hydrocarbon phosphines may be aromatic triaryl phosphorus compounds, e.g., triphenyl phosphite, triphenyl phosphine, or aliphatic trialkyl phosphorus compounds, e.g., trihexyl phosphite, trihexyl phosphine, tridecyl phosphite, tridecyl phosphine, hexyl didecyl phosphite, dihexyl decyl phosphine, or arylalkyl compounds, e.g., phenyl didecyl phosphite, diphenyl decyl phosphite, etc. For this reason the stabilizers according to the invention are designated as cuprous iodide complexed with, in general, phosphites and phosphines having three hydrocarbon aryl of alkyl groups.

The amount of stabilizer used according to the invention may be varied within wide limits. In most cases it is not necessary to use more than 0.5% by weight of stabilizer with respect to the amount of polyamide. Even with very small amounts, e.g., 0.05–0.15% by weight, it is usually effective to achieve a sufficient degree of stabilization. Of course, large amounts of the stabilizer may be used, e.g., 0.5 to 2%, but generally amounts in excess of 1% will not bring proportionately added stabilizing effect.

The stabilizers may be added before, during, or after the polymerization of the polyamides. If the stabilizer is to be added before the polymerization, it can be added to the monomeric materials to be polymerized while they are kept in storage, either as a solid or as a liquid substance. Alternatively, the stabilizers of the invention can be added to the polymerization reactor during or after the polymerization reaction.

The stabilizers according to the invention are suited for the stabilization of polyamides in general, including polymerization products of lactams, e.g., caprolactam, oenantholactam, laurinolactam, and polycondensation products from diamines and dicarboxylic acids as well as polymerization products of amino-carboxylic acids.

Example I

About 1.1 gm. mole of cuprous iodide was added to 2.0 gm. moles of triphenyl phosphite in 1500 gm. of benzene. The mixture was refluxed for about one hour. The resultant solution was filtered and distilled to remove the benzene solvent. The triphenyl phosphite-cuprous iodide complex so obtained weighed 810 gm.

Example II

Example I was repeated except that 2 gram moles of tridecyl phosphite was substituted for the triphenyl phosphite. About 1190 grams of tridecyl phosphite-cuprous iodide complex were obtained.

Example III

The effects of the stabilizers of the invention may be assessed by measuring the relative viscosity of the stabilized polyamide. By the term relative viscosity is meant the viscosity of a solution of 1 gram of polyamide in 100 g. of sulphuric acid (96% by weight) at 20° C., with respect to the viscosity of this sulphuric acid.

In order to obtain comparable results in the following tests, the polyamide sample in each instance was prepared in the same way, namely, by heating a mixture of 96 g. of caprolactam, 4 g. of water, 0.015 g. of acetic acid and the stabilizer sample for 18 hours at a temperature of 260° C. in a nitrogen atmosphere. After the polymerization was completed, the polyamide was made into a filament which was wound up and tested by exposing it to air at 205° C. in a furnace. The relative viscosity was measured after 6 hours and after 18 hours.

The results so obtained are shown in the table below.

TABLE

| Stabilizer | Amount (mg.) | Relative Viscosity After— | | |
|---|---|---|---|---|
| | | 0 hr. | 6 hrs. | 18 hrs. |
| Triphenyl phosphine cuprous iodide complex. | 30 | 2.39 | 1.73 | 1.44 |
| | 50 | 2.40 | 2.45 | 2.12 |
| | 100 | 2.27 | 2.47 | 2.19 |
| | 200 | 2.27 | 2.48 | 2.06 |
| Triphenyl phosphite cuprous iodide complex. | 23 | 2.57 | 1.56 | ---------- |
| | 50 | 2.36 | 2.10 | 1.85 |
| | 100 | 2.37 | 2.29 | 2.04 |
| | 200 | 2.41 | 2.49 | 2.06 |
| Tridecyl phosphite cuprous iodide complex. | 51 | 2.40 | 2.04 | 2.06 |
| | 98 | 2.37 | 2.24 | 2.00 |
| | 246 | 2.26 | ---------- | 2.03 |
| Diphenyl decyl phosphite cuprous iodide complex. | 64 | 2.26 | 2.09 | 1.84 |
| | 134 | 2.37 | 2.31 | 2.02 |
| | 218 | 2.26 | 2.27 | 1.96 |

Polyamide made in accordance with the above procedure but which was not stabilized was charred after 6 hours of heating at the above conditions. The results herein clearly demonstrate the stabilizing effect of the complex compounds of the invention.

Although the results shown in the table above were obtained by adding the stabilizers before the polymerization of the polyamide, these results are typical and similar to results obtained when the stabilizers were added to polymerized polyamide. It is a special feature of the present invention that the novel stabilizers herein can be conveniently prepared by simple procedure and thereafter be easily incorporated into the polyamide to be stabilized.

What is claimed is:

1. A stabilized polyamide composition comprising a polyamide and a stabilizing amount of a complex compound of cuprous iodide with a member of the class consisting of hydrocarbon phosphines and hydrocarbon phosphites, having one gram mole of cuprous iodide for each two moles of said phosphine or phosphite, said complex compound having the molecular structure of the complex compound made by dissolving cuprous iodide and the said phosphine or phosphite, in the molar ratio of about 1:2, in a hydrocarbon solvent and reacting at a temperature up to the boiling point of said solvent.

2. A stabilized polyamide composition according to claim 1 wherein said complex is a complex compound of cuprous iodide and triphenyl phosphite.

3. A stabilized polyamide composition according to claim 1 wherein said complex is a complex compound of cuprous iodide and triphenyl phosphine.

4. A stabilized polyamide composition according to claim 1 wherein said complex is a complex compound of cuprous iodide and tridecyl phosphite.

5. A stabilized polyamide composition according to claim 1 wherein said complex is a complex compound of cuprous iodide and diphenyl decyl phosphite.

6. The composition of claim 1 wherein the hydrocarbon phosphines and phosphites are selected from alkyl and aryl phosphines and phosphites and mixtures thereof.

References Cited

UNITED STATES PATENTS 2,705,227   3/1954   Stamatoff _____ 260—45.7
3,294,870   12/1966   Grayson et al. ____ 260—438.1

OTHER REFERENCES

Chemical Abstracts 49, 6998c (1955).

DONALD E. CZAJA, *Primary Examiner.*

V. P. HOKE, *Assistant Examiner.*

U.S. Cl. X.R.

260—45.7, 45.9, 438